(12) United States Patent
Kota et al.

(10) Patent No.: US 8,391,176 B2
(45) Date of Patent: *Mar. 5, 2013

(54) SYSTEM AND METHOD FOR BENCHMARKING LOCATION DETERMINING SYSTEMS

(75) Inventors: Sekhar Kota, Atlanta, GA (US); Todd Crick, San Diego, CA (US); Michael Dunn, Seattle, WA (US); Mario Proietti, Fullerton, CA (US); Khaled Dessouky, Studio City, CA (US); Daniel A. Lambert, Carlsbad, CA (US); Ronald L. Poulin, Victoria (CA)

(73) Assignee: TechnoCam Corporation, Carlsbad, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/902,421

(22) Filed: Oct. 12, 2010

(65) Prior Publication Data
US 2011/0028122 A1    Feb. 3, 2011

Related U.S. Application Data

(63) Continuation of application No. 12/371,330, filed on Feb. 13, 2009, now Pat. No. 7,835,349.

(51) Int. Cl.
*H04J 1/16* (2006.01)
*H04J 3/14* (2006.01)
*H04L 1/00* (2006.01)
*H04L 12/26* (2006.01)

(52) U.S. Cl. ............................................... 370/252
(58) Field of Classification Search .................. None
See application file for complete search history.

(56) References Cited

U.S. PATENT DOCUMENTS

| 4,361,851 A | 11/1982 | Asip et al. |
| 5,566,225 A | 10/1996 | Haas |
| 5,675,510 A | 10/1997 | Coffey et al. |
| 5,774,802 A | 6/1998 | Tell et al. |
| 5,796,952 A | 8/1998 | Davis et al. |
| 5,872,588 A | 2/1999 | Aras et al. |
| 5,987,306 A | 11/1999 | Nilsen et al. |
| 5,987,320 A | 11/1999 | Bobick |
| 5,991,735 A | 11/1999 | Gerace |
| 6,041,236 A | 3/2000 | Bernardin et al. |

(Continued)

FOREIGN PATENT DOCUMENTS

| EP | 0849908 A2 | 6/1998 |
| GB | 2348777 | 6/2006 |

(Continued)

OTHER PUBLICATIONS

PCT Int'l Search Report and Written Opinion for PCT/US06/32826, mailing date Apr. 30, 2007 (9 pages).

*Primary Examiner* — Hassan Phillips
*Assistant Examiner* — Prenell Jones
(74) *Attorney, Agent, or Firm* — Christie, Parker & Hale, LLP

(57) ABSTRACT

Systems, methods, and software are described for benchmarking the location determination capabilities of a wireless communications network. A mobile communications device is configured to receive data identifying a reference location for the device. A communications network, communicatively coupled with the mobile communications device, calculates a computed location for the device using an alternative location determination technique. The reference location and computed location may be determined for any number of additional devices, as well. The accuracy and reliability of a system may then be assessed by comparing one or more computed locations with associated reference locations. The latency attributable to the calculation of one or more computed locations may also be determined.

12 Claims, 12 Drawing Sheets

U.S. PATENT DOCUMENTS

| | | |
|---|---|---|
| 6,115,680 A | 9/2000 | Coffee et al. |
| 6,138,147 A | 10/2000 | Weaver et al. |
| 6,363,323 B1 | 3/2002 | Jones |
| 6,397,256 B1 | 5/2002 | Chan et al. |
| 6,405,245 B1 | 6/2002 | Burson et al. |
| 6,405,251 B1 | 6/2002 | Bullard et al. |
| 6,434,364 B1 | 8/2002 | O'Riordain |
| 6,456,852 B2 | 9/2002 | Bar et al. |
| 6,470,386 B1 | 10/2002 | Combar et al. |
| 6,594,483 B2 | 7/2003 | Nykanen et al. |
| 6,603,966 B1 | 8/2003 | Sheffield |
| 6,614,126 B1 | 9/2003 | Mitchell |
| 6,745,011 B1 | 6/2004 | Hendrickson et al. |
| 6,754,470 B2 | 6/2004 | Hendrickson et al. |
| 6,795,444 B1 | 9/2004 | Vo et al. |
| 6,819,924 B1 | 11/2004 | Ma et al. |
| 6,842,431 B2 | 1/2005 | Clarkson et al. |
| 6,871,066 B1 | 3/2005 | Khullar et al. |
| 6,970,702 B1 | 11/2005 | Martin |
| 7,281,222 B1 | 10/2007 | Babcock |
| 2002/0025795 A1 | 2/2002 | Sharon et al. |
| 2002/0035605 A1 | 3/2002 | McDowell et al. |
| 2002/0094782 A1 | 7/2002 | Lin |
| 2002/0094785 A1 | 7/2002 | Deats |
| 2002/0138607 A1 | 9/2002 | O'Rourke et al. |
| 2003/0018521 A1 | 1/2003 | Kraft et al. |
| 2003/0023681 A1 | 1/2003 | Brown et al. |
| 2003/0054834 A1 | 3/2003 | Gutowski et al. |
| 2003/0054835 A1 | 3/2003 | Gutowski et al. |
| 2003/0083069 A1 | 5/2003 | Vadgama |
| 2003/0145328 A1* | 7/2003 | Rabinowitz et al. ............ 725/72 |
| 2003/0195008 A1 | 10/2003 | Mohi et al. |
| 2004/0165066 A1* | 8/2004 | Opshaug et al. .............. 348/181 |
| 2004/0203897 A1 | 10/2004 | Rogers |
| 2004/0233930 A1 | 11/2004 | Colby, Jr. |
| 2005/0163201 A1* | 7/2005 | Krasner ....................... 375/150 |
| 2005/0288033 A1 | 12/2005 | McNew et al. |
| 2006/0022800 A1 | 2/2006 | Krishna et al. |
| 2006/0141998 A1 | 6/2006 | Kennedy, Jr. et al. |
| 2006/0194593 A1 | 8/2006 | Drabeck et al. |
| 2007/0042716 A1* | 2/2007 | Goodall et al. ............. 455/67.11 |
| 2007/0117573 A1 | 5/2007 | Kennedy, Jr. et al. |
| 2007/0287473 A1 | 12/2007 | Dupray |
| 2008/0108319 A1 | 5/2008 | Gallagher |
| 2008/0112551 A1* | 5/2008 | Forbes et al. .............. 379/142.1 |
| 2008/0248811 A1 | 10/2008 | Maloney et al. |

FOREIGN PATENT DOCUMENTS

| | | |
|---|---|---|
| WO | WO 98/26541 | 6/1998 |

* cited by examiner

| Called number | UTC Time | Satellites Visible | Reference | | | Computed | | Error (m.) |
|---|---|---|---|---|---|---|---|---|
| | | | Latitude | Longitude | | Latitude | Longitude | |
| 110101 | 21:50:10 | 8 | 47.65894 | -122.136 | | 47.66031 | -122.135 | 164.61 |
| 110101 | 21:50:15 | 8 | 47.66019 | -122.135 | | 47.66613 | -122.127 | 935.24 |
| 110101 | 21:50:48 | 8 | 47.66628 | -122.129 | | 47.66594 | -122.127 | 165.58 |
| 110101 | 21:50:55 | 8 | 47.66573 | -122.128 | | 47.66555 | -122.127 | 69.18 |
| 110101 | 21:51:07 | 8 | 47.66557 | -122.128 | | 47.66513 | -122.128 | 50.42 |
| 110101 | 21:51:14 | 8 | 47.66556 | -122.128 | | 47.66574 | -122.127 | 76.52 |
| 110101 | 21:51:40 | 9 | 47.66551 | -122.128 | | 47.66544 | -122.127 | 40.97 |
| 110101 | 21:51:44 | 9 | 47.66924 | -122.128 | | 47.66957 | -122.129 | 465.36 |
| 110101 | 21:52:33 | 9 | 47.66923 | -122.129 | | 47.66931 | -122.128 | 66 |
| 110101 | 21:52:39 | 9 | 47.66921 | -122.129 | | 47.66945 | -122.129 | 33.58 |
| 110101 | 21:53:06 | 10 | 47.66921 | -122.129 | | 47.6697 | -122.128 | 68.23 |
| 110101 | 21:53:13 | 10 | 47.67105 | -122.132 | | 47.671 | -122.133 | 367.06 |
| 110101 | 21:53:47 | 10 | 47.67258 | -122.133 | | 47.67202 | -122.132 | 108.86 |
| 110101 | 21:53:57 | 9 | 47.67604 | -122.134 | | 47.67617 | -122.135 | 425.78 |
| 110101 | 21:54:17 | 10 | 47.67787 | -122.135 | | 47.67682 | -122.134 | 99.05 |
| 110101 | 21:54:29 | 10 | 47.68031 | -122.135 | | 47.67744 | -122.134 | 93.13 |
| 110101 | 21:54:47 | 10 | 47.68086 | -122.135 | | 47.68085 | -122.134 | 74.97 |
| 110101 | 21:54:51 | 10 | 47.68145 | -122.135 | | 47.68121 | -122.134 | 50.1 |
| 110101 | 21:54:56 | 10 | 47.68223 | -122.135 | | 47.68204 | -122.134 | 88.61 |
| 110101 | 21:55:07 | 10 | | | | 47.68228 | -122.134 | 76.36 |

FIG. 6

SYSTEM AND METHOD FOR BENCHMARKING LOCATION DETERMINING SYSTEMS

CROSS-REFERENCE TO RELATED APPLICATIONS

This application is a continuation of U.S. patent application Ser. No. 12/371,330, filed on Feb. 13, 2009, which is a continuation of U.S. patent application Ser. No. 11/464,730, filed on Aug. 15, 2006, issued as U.S. Pat. No. 7,529,236, which are hereby incorporated by reference, as if set forth in full in this document, for all purposes.

FIELD OF THE INVENTION

The present invention relates to wireless communications in general and, in particular, to testing location determination capabilities.

BACKGROUND OF THE INVENTION

Over the past decade, while the cost of wireless communications technology has dropped, performance increased substantially, leading to widely increased use of wireless devices. Location determination technologies, including the use of global positioning satellites ("GPS"), have evolved, as well. Thus, as use of mobile devices has grown, so has the importance of accurate location determination capabilities. For example, emergency service providers may better identify the location of an emergency when this technology is integrated into mobile devices reporting the emergency. A number of additional uses for location determination capabilities have arisen, as well.

A response to this evolving landscape was the Wireless Communications and Public Safety Act of 1999 ("911 Act"). One purpose of the 911 Act was to enhance public safety by encouraging and facilitating the prompt deployment of a nationwide communications infrastructure for emergency services that includes wireless communications. The Federal Communications Commission ("FCC") adopted certain rules to implement provisions of the Act, including rules requiring certain levels of accuracy and reliability.

Drive test systems are a tool used by communications service providers to measure performance, and may be employed to verify whether location determination capabilities are accurate and comply with FCC requirements. Drive test systems, as the name implies, are tools that characterize the performance of a system by driving around and performing test measurements from different locations. Such systems may rely on a technician or other professional to drive to different coverage areas, perhaps with bulky equipment including specially configured laptops and other hardware.

A limitation of this approach is that it generally requires a person to drive around and make the measurements. This often entails the use of expensive electronic equipment, costs associated with the vehicle, and personnel costs for the measurement technician. There are some drive test solutions where the measurement is done automatically, requiring less administration by a technician. Such systems are often dubbed "unattended" systems, while systems requiring professional, ongoing measurement are often referred to as "attended" systems. Unattended systems are typically associated with a permanent location.

Nonetheless, there are certain inherent limitations associated with "drive test" solutions. Because of costs, measurement is often geographically limited to major markets and roads, and measurements are only taken at certain times. It would be desirable to create solutions that address the inherent limitations associated with drive testing, while continuing to measure the location determination capabilities of a wireless service provider at a variety of locations.

BRIEF SUMMARY OF THE INVENTION

Systems, methods, and software are described for benchmarking the location determination capabilities of a wireless communications network. In one exemplary embodiment, a mobile communications device receives data identifying a reference location for that device. A communications network, communicatively coupled with the mobile communications device, calculates a computed location of the device using an alternative location determination technique. The reference and computed locations may then be determined for a number of additional devices. The accuracy of the computed location is then determined by comparing such measurements with the reference locations.

One set of exemplary embodiments comprises systems for benchmarking location determination capabilities for one or more mobile communications devices. In one embodiment, a device is configured to receive a first set of data identifying the location of the device, and the location is identified with a first technique. The device generates a second set of data formatted to trigger a communications network to identify the location of the device using a second technique. The device transmits one or more communications signals comprising the first set of data and the second set of data. The device is configured to generate and transmit the data during regular and customary use of the device by a user who regularly and customarily uses the device primarily for purposes of voice or data communication.

The communications network is configured to receive the second set of data, thereby triggering the network to calculate the location of the device using the second technique. The network then generates a third set of data representative of the location identified using the second technique. A location processing server is configured to store at least a subset of the first set of data and the third set of data in a data store associated with the location processing server.

The device, in one embodiment, analyzes the first set of data identifying the location of the device to determine whether it meets or exceeds a threshold accuracy metric before triggering the network calculation. The device is further configured to trigger the network to identify the location of the device at certain variable intervals corresponding to the earlier of a time interval metric and a distance movement metric. The mobile communications device may be configured to trigger the network calculation by making a test call to either the emergency number (e.g., 911) or a special test number, and the network is triggered without notifying a public safety answering point. In another embodiment, the network location calculation is triggered by a application that is running on the device.

In one embodiment, the device receives GPS coordinates from a number of GPS satellites, while the second technique, performed by the network, comprises assisted GPS. In an alternative embodiment, the second technique instead comprises a Time Difference Of Arrival ("TDOA") technique. The location processing server is configured to associate the first set of data and the third set of data to identify accuracy of the calculated location, and a period of latency attributable to the calculated location. The first set of data and the third set of data represent a location of the device at a substantially same time.

An alternative set of exemplary embodiments comprises methods of benchmarking location determination capabilities with a mobile communications device. In one embodiment, a first set of data identifying the location of the device is received, the location identified with a first technique. A second set of data associated with the first set is generated, the second set formatted to trigger a communications network to calculate location of the device using a second technique. One or more communications signals comprising the first set of data and the second set of data are then transmitted. This method may be implemented on a computer readable medium as a computer program comprising instructions executable by a mobile communications device.

In one embodiment, the first set of data is analyzed to determine that the location information is above a threshold accuracy level before triggering the network. There may be a variable interval between transmissions of the second set of data to trigger the network calculations, the interval corresponding to a time interval, a distance movement metric, a location metric, or any combination thereof. A number of alternative location determination techniques may be used.

Still another set of exemplary embodiments comprises methods of benchmarking location determination capabilities in a wireless communications network. A first set of data identifying a reference location of the device is received from the device, the reference location identified with a first technique. A second set of data identifying a computed location of the device is received from a communications network, the computed location calculated by the communications network using a second technique. The first set of data and second set of data each represent a location of the device at a substantially same time, and these measurements may be associated with each other and stored.

An accuracy, latency period, and yield attributable to the computed location is made by comparing the first set of data and the second set of data, and their associated timestamps. The reference location and computed location may be determined for a number of additional devices, and this data may be used in determining accuracy, latency period, and yield. A test call may be received from the mobile communications device to trigger the communications network to generate the second set of data. The test call may be identified as a test, and thereby notification to the public safety answering point may be omitted about the test call based at least in part on the identifying step.

In one embodiment, a summarized report of the determined accuracy of the second technique is provided. This report may be provided for a subset of the associated sets of data and may be provided on an interface that is accessed from and distributed to a remote location. The report may be image data comprising a map illustrating an accuracy metric associated with at least a subset of the computed locations. Different locations may be weighted differently in determining the accuracy of the second technique.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 represents an example of an interface showing a table illustrating reference location measurements and computed location measurements, according to various embodiments of the present invention.

DETAILED DESCRIPTION OF THE INVENTION

Various embodiments of the present invention comprise systems, methods, and software for measuring location determination capabilities in a wireless communications network. A reference location and a computed location are captured passively for actual user devices as they go about their regular activity. Mobile phones, or other communications devices, may be configured to receive reference location data and trigger the network to compute their location. The different sets of collected data may be transmitted to a database, and be parsed and displayed in a variety of different ways. Location determination metrics are, therefore, not limited to major markets or roads, and instead may be collected in other locations where users use their devices. The location data may, thus, be collected in real time over real world routes and usage scenarios.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following embodiments.

Figure 1:
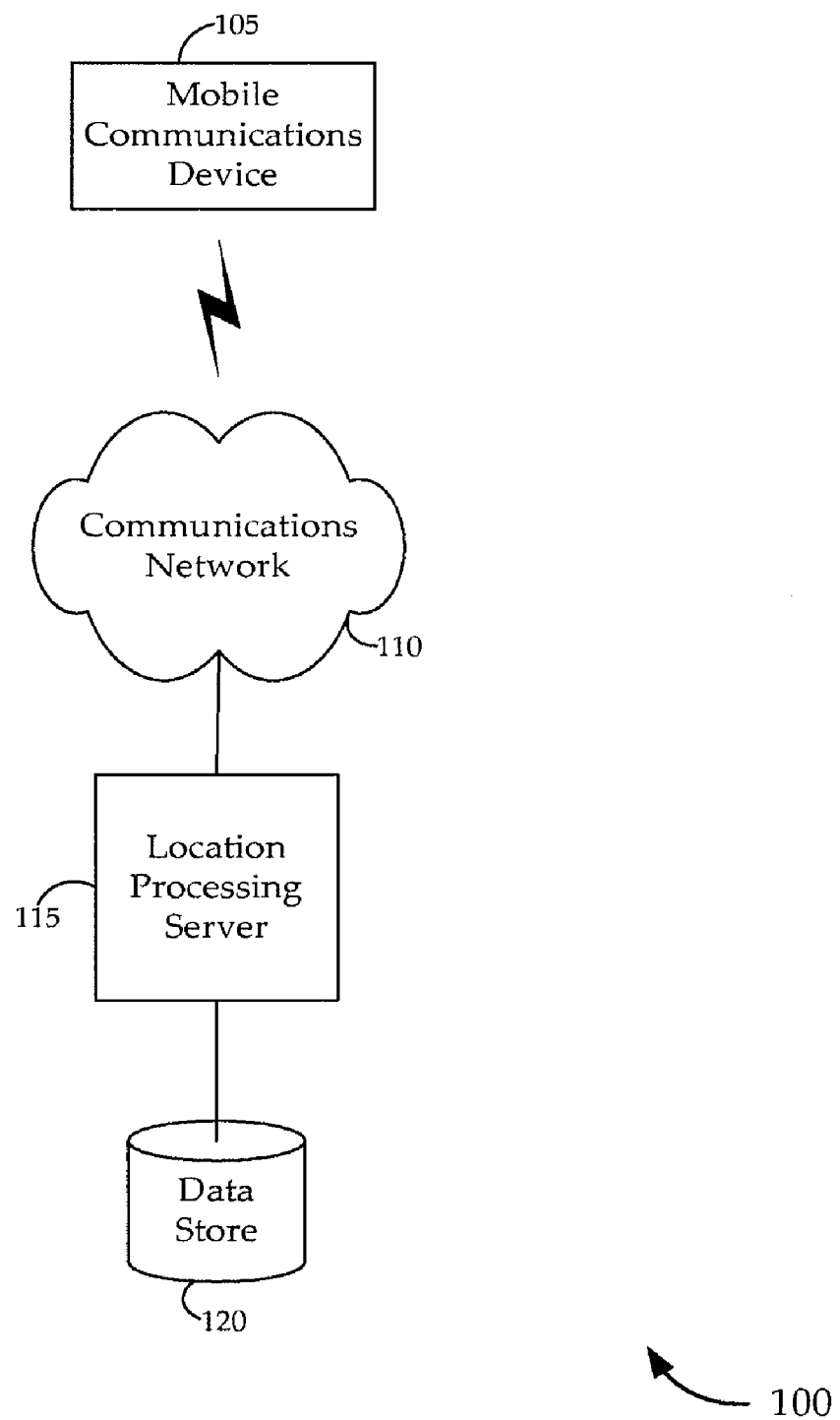
FIG. 1 is a block diagram illustrating a system for benchmarking location determination capabilities of a wireless communications network, according to various embodiments of the present invention.

FIG. 1 illustrates an exemplary embodiment of the invention, comprising a system 100 for benchmarking location determination capabilities of a communications network. This embodiment includes a mobile communications device 105 in communication with the communications network 110. The device 105 is configured to receive a first set of location based data identifying location of the device. This first set of data identifies a location which may be referred to elsewhere herein as the reference location. The device 105 may be directly or indirectly coupled with a receiver component which enables the reception of location based data.

In one embodiment, the location based data comprises GPS coordinate data, along with a timestamp and a number of satellites used. As the term is used herein, location based data may, alternatively, be in the form of other satellite location information, cellular location information, network analysis of location information, location information specific to a building, or other means for location determination. The data may be received by hardware configured to receive the set of data identifying the location of the device. The receiver may be coupled with the device 105 in any suitable manner known in the art. By way of example, it may be an integrated component or may be a stand alone receiver otherwise communicating with the device 105. In some embodiments, the hardware may be removable from the device (e.g., a GPS receiver communicatively coupled with the Device 105 with a USB or bluetooth connection). In other embodiments, the hardware configured to receive the set of data identifying the location of the device 105 may comprise other GPS receiver configurations. A receiver may, alternatively, comprise any other combination of hardware and software to achieve the functionality described above.

The device 105 may be a cellular phone, a VoIP phone, a personal digital assistant, a pager, a text messaging device, a laptop, a portable digital music player, a two-way radio, any mobile phone or other wireless device that communicates data signals, voice or other audio signals, or any combination of the foregoing. In one embodiment, the device 105 is a phone being used for voice calls by an actual user, wherein the location based data is being captured passively by the device 105 as the user acts as a passive agent while going about his or her regular use. The location based data may be received during the regular and customary usage of a phone or other device, and may occur while a consumer uses the phone or other device for purposes of voice communication. This received location based data may be stored on a temporary or more permanent basis on the storage medium of the device 105, and in certain circumstances transmitted as payload of a data packet (e.g., via GSM, GPRS, EDGE, UMTS, CDMA 1xRTT, EvDO, WiFi, WiMax, SMS, etc.) to a location processing server 115 (perhaps via the communications network 110).

The device 105 may be configured to analyze the location based data to determine whether it meets or exceeds a threshold accuracy. For example, the device may include a logic module configured to read and cache GPS coordinate data to determine whether an accurate reference location may be determined. The threshold accuracy level may be predetermined in the logic module, or may be configured by a user or communications network. The threshold accuracy may also be identified by the communications network 105. In this set of embodiments, if the threshold accuracy level is reached, the device 105 may proceed to trigger the communications network 110 to calculate a computed location of the device. Therefore, based at least in part on the threshold accuracy determination, the device 105 may automatically generate a set of data formatted to trigger the communications network 110 to identify the location of the device using a second technique. This generated set of data may comprise a test telephone number or other communications address. Alternatively, it may comprise a data message configured to initiate a test call from the device. In still other embodiments, it comprises payload of a data packet to be transmitted to the communications network to trigger the communications network 110 to perform secondary location calculations.

Regardless of the type of generated data (which may also be referred to herein as "triggering data"), the device 105 transmits at least a subset of this data to the communications network 110. The transmission may comprise a test call to a test telephone number configured by a service provider to trigger the communications network 110 to calculate location of the device using a second technique without notifying a public safety answering point ("PSAP"). Alternatively, the transmission may comprise a test call to an emergency number (e.g., 911) configured by a service provider to trigger the location calculation using the second technique without notifying a PSAP (or, perhaps, simply notifying the PSAP that the call is a test). This latter configuration, wherein a call to an emergency number does not falsely alert the PSAP, is possible by including certain data in the transmission or having a PSAP recognize certain numbers as test numbers. In still other embodiments, the device may transmit the generated data as payload of a data packet transmitted to the communications network 110 (e.g., via GSM, GPRS, EDGE, UMTS, CDMA 1xRTT, EvDO, WiFi, WiMax, SMS, etc.). In addition to transmitting the generated data, the device also transmits at least a subset of the received location based data (i.e., the reference location data). The reference location data may be transmitted with the triggering data, or may be cached and/or otherwise transmitted (as a single reading, or in a compiled fashion), through to the location processing server 115.

The communications network 110, in one embodiment, comprises a wireless telecommunications network operated by one, or more, communications service providers. For example, a wireless network may include any of the variety of known modes of wireless or mobile voice communications. Exemplary cellular systems include, but are not limited to, TDMA, CDMA, WCDMA, UMTS and GSM systems. Other exemplary cellular systems include systems known in the art as 3G systems. The communications network 110 is not, however, limited to cellular networks, and may comprise any network with two or more computing device exchange communication signals (e.g., a VoIP network). Therefore, a network 110 may comprise any type of wireless (e.g., a WiFi connection) voice service that is provided over a data network (e.g., an Internet Protocol based network). The term VoIP is intended to be interpreted broadly to include any system wherein a voice signal is converted into a digital signal that travels over a data network. VoIP also includes any system wherein a digital signal from a data network is delivered to a phone or other mobile voice communications device, where it is converted into an audio signal.

Upon receiving the triggering signal from the device 105, the communications network 110 calculates the location of the device 105 using a second technique. This location may be referred to elsewhere herein as the computed location. Wireless telecommunications carriers may employ a variety of techniques of locating cellular telephones and other mobile computing devices. By way of example, service providers may use base station and other cellular towers for various time difference of arrival ("TDOA"), time of arrival ("TOA"), angle of arrival ("AOA"), RF Fingerprinting, location pattern matching methods, and combination methods. These methods may include modified, or unmodified, device 105 configurations.

Alternatively, a service provider may use assisted GPS ("A-GPS"), wherein the device receiver, and an assistance server located in (or otherwise communicating with) the network 110, share processing tasks. With A-GPS, the process is often quicker and can save power on the device 105, as the assistance server may have computing capabilities far beyond that of the GPS receiver at the device. As used herein, the term A-GPS describes a system where a server, such as assistance server, assists an A-GPS receiver in performing range measurements and position solutions. The assistance server may also be configured to access information from the network 110, and communicate with the device 105 via the network 110.

While the communications network 110 may identify the location of the device using the above methods, the network identification may be based on other types of location based data, as well. For example, the above techniques may be used in conjunction with other input from additional sources (e.g., the device itself). Also, there may be additional methods of triangulation or other location identification using cellular towers or access points (e.g., WiFi access points identifying the location of a VoIP device). The location based information may include altitude information also. Cellular carriers and other service providers may, therefore, employ a variety of ways of locating cellular telephones and other mobile computing devices. Additionally, any combination of the above may be used, as well. It is anticipated that location technologies will evolve, and the set of technologies that may be used by a communications network 110 to identify location of a device 105 should be interpreted to include new forms of network based location identification.

Once the communications network 110 has identified the location of the device 105 using the second technique, it generates a set of data representative of the location. This may, for example, include latitude and longitude readings, or other location identification as known in the art. As noted above, this set of data identifies a location which may be referred to elsewhere herein as the computed location. In this embodiment, the reference location and computed location identify the location of the device 105 at a substantially same time.

The system 100 also includes a location processing server 115, which may include, for example, one or more suitable computing devices such as server computers, personal computers, workstations, web servers, or other such devices. One or more of such devices that collectively comprise the location processing server 115 also comprise software elements including an operating system and other programs/code. The location processing server 115 includes application software that programs the server system 115 to perform one or more functions according to the present invention. For example, application software resident on the location processing server 115 may be executable to receive, analyze, store, or transmit reference and computed location data from a device 105 or network 110. The location processing server 115 may be an integrated part of the communications network 110, or be separate.

The location processing server 115 is in direct or indirect communication with the network 110, and is further in communication with the device 105 (via the network 110, or otherwise). The location processing server 115 receives the location based data which is received and transmitted by the device 105 (i.e., the reference location data). This reference location data may be received with an identifier, such as a telephone number, a timestamp, a dialed telephone number, a cell identification number, and any combination thereof. This identifier may be appended to the reference location data when transmitted by the device 105. The location processing server 115 also receives the location based data generated and transmitted by the network 110 (i.e., the computed location data). This computed location data may be under the control of a service provider, and may be received by the location processing server 115 with an appended identifier (i.e., a telephone number, a timestamp, a dialed telephone number, a cell identification number, or any combination thereof). This identifier may first be generated by the device 105 and transmitted to the network 110 with the triggering communications signal. It may then be appended to the computed location data when that data is transmitted by the network 110. Thus, the location processing server 115 is configured to correlate the reference location data received from the device with the computed location data received from the communications network.

In one set of embodiments, different combinations of the reference and computed location based data may be received, analyzed, stored, or transmitted by the location processing server 115. The location processing server 115 may be configured, in coordination with the data store 120, to aggregate data records, tag each call record with additional reference data (test location and cluster tag), filter test call records, and generate performance reports.

The data may, thus, be organized according to cluster or grid definitions and cell coverage areas. The location processing server 115 may create reports detailing various call volumes, which may be organized as raw or weighted accuracy reports and summaries. In one embodiment, the image data illustrating a map is created, with a graphical representation of the accuracy (i.e., difference in computed vs. reference location) of one or more devices 105. In another embodiment, the location processing server 115 may create or transmit a table illustrating the accuracy for one or more devices 105 at various locations. In yet another embodiment, the system determines a plurality of geographic regions defining certain locations, and displays a table with different combinations of measurements associated with those locations and regions.

Information may be retrieved from, or stored, in a data store 120 in communication with the location processing server. Information (such as tables, image data, or consolidated data) created by the location processing server 115 may be transmitted over a network such as the Internet to a desktop computer or other workstation, where carriers, enterprises, or other users may access the information. It will be apparent to those skilled in the art that substantial variations may be implemented in accordance with the specific requirements of the different embodiments. The location processing server 115 may be fully located within a single facility or distributed geographically, in which case a network (such as the communications network 110) may be used to integrate different components of the server 115.

The data store 120 may comprise a single database or may comprise any number of separate and distinct databases. The data store 120 may comprise one, or more, relational databases or components of relational databases (e.g., tables), object databases or components of object databases, spreadsheets, text files, internal software lists, or any other type of data structure suitable for storing data. Thus, it should be appreciated that data store 120 may be multiple data storages (of the same or different type), or may share a common data storage with other data stores. The data store 120 may contain any reference or computed location data and information related thereto, the times or time periods of the data points or measures, various identifiers of the data, and geographic region data. The data store 120 may also contain user and device 105 related information (e.g., MAC address, IP address, phone number, IMSI, or IMEI), and service provider information (e.g., service provider, system carrier, or network carrier). The data store 120 may include any number of tables and sets of tables. Application software running on the location processing server 115 queries the data store 120, and produces forms, reports, tables, images or other output as dictated by the application software.

The data store 120 may be incorporated within the location processing server 115 (e.g., within its storage media), or may be a part of a separate system otherwise associated with the server 115. The data store 120 may be fully located within a single facility or distributed geographically. The data store 120 may be organized in any manner different than described above to provide the functionality called for by the various embodiments, as known by those skilled in the art.

According to one embodiment, the data store 120 includes an electronic map database, providing data related to streets, buildings, malls, parks, lakes, rivers, mountains, and other related geographic and topographic information. This information may be configured to be correlated against coordinates that are produced with reference and computed location data received by the location processing server 115. Tables may be comprised of data on large geographic areas, such as countries, states, and counties. Tables may also be comprised of smaller geographic areas, such as urban areas, cities, communities, and the like. Different sizes, shapes, colors, dots, icons, and fonts may be used to indicate different features. The content of the electronic map database may include any combination of the aforementioned attributes and information. The design and organization of the aforementioned tables is discretionary and within the skill of those of ordinary skill in the art, given the descriptions of data fields herein.

Various components of the system 100 may be connected via any combination of the following: the Internet, an IP network, an intranet, a wide-area network ("WAN"), a local-area network ("LAN"), a virtual private network, the Public Switched Telephone Network ("PSTN") or any other type of network supporting communication between devices described herein, in different embodiments. There may be both wired and wireless connections, including optical links. Many other examples are possible and apparent to those skilled in the art in light of this disclosure. In the discussion, the connections may or may not be noted specifically.

Figure 2:
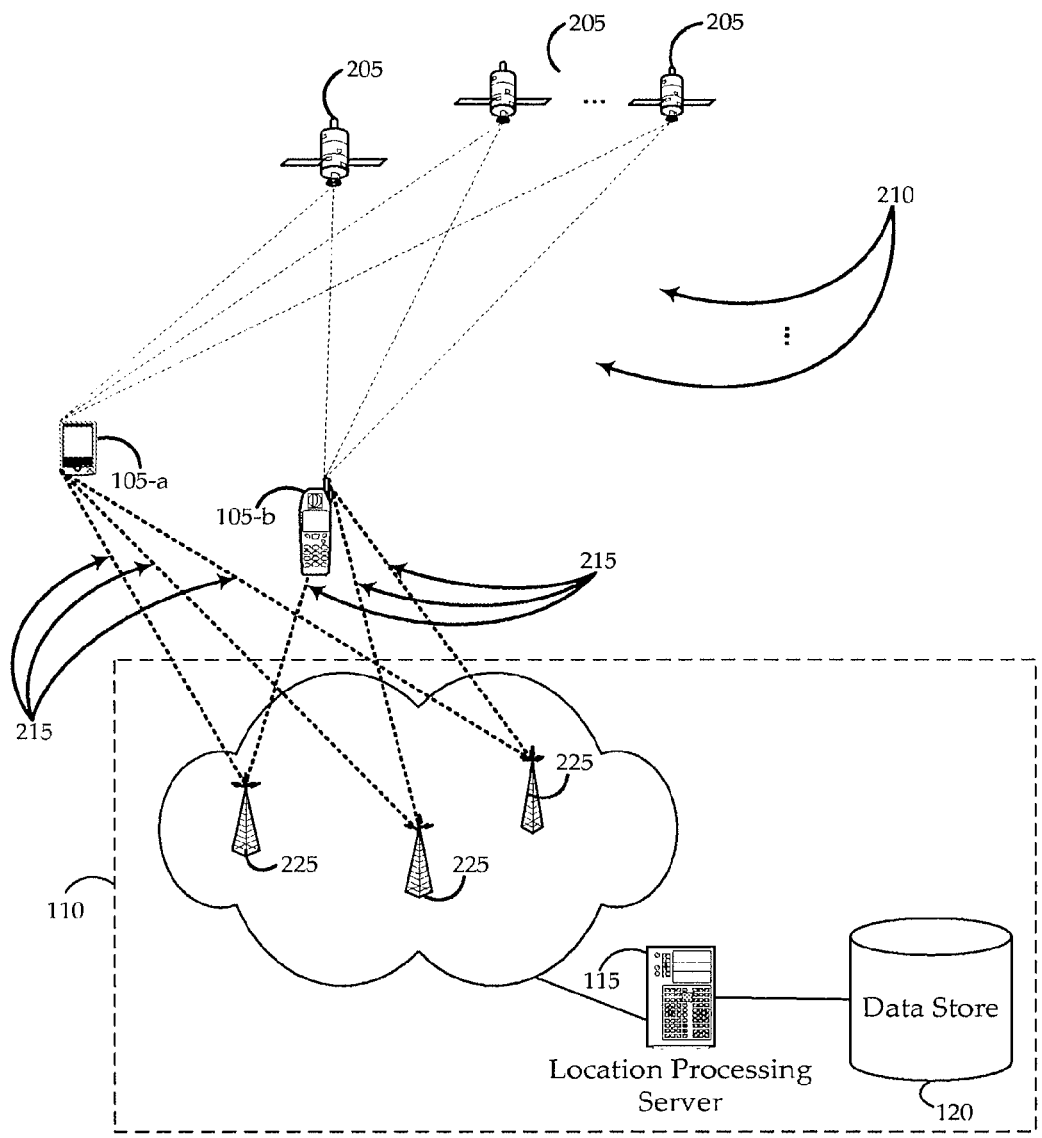
FIG. 2 is a block diagram illustrating a system for benchmarking a time difference of arrival technique for locating a mobile communications device in a communications network, according to various embodiments of the present invention.

Turning to FIG. 2, an exemplary telecommunications system 200 is illustrated. The system 200 comprises an exemplary embodiment of the system 100 described in relation to FIG. 1. The embodiment illustrated in FIG. 2 includes a set of GPS satellites 205. Exemplary devices, including a PDA 105-*a* and cell phone 105-*b*, receive GPS coordinate data 210 from the GPS satellites 205 (e.g., via a GPS receiver that is coupled with or otherwise integrated into the device). This received GPS coordinate data 210 comprises the reference location data in this embodiment. This GPS coordinate data 210, and associated identifiers, is transmitted in a communications signal through the network 110 to the location processing server 115. In this embodiment, the network includes the location processing server 115 and data store 120.

When a device 105 determines that it has received GPS coordinate data that exceeds a certain accuracy threshold, the device in this embodiment makes a test call to a telephone number in the communications network 110. The telephone number is configured by a service provider to trigger the network 110 to identify the location of the device using a time difference of arrival ("TDOA") analysis. The techniques are typically based on estimating the difference in the arrival times of one or more signals 215 from the source (e.g., a device 105) at multiple receivers (e.g., base stations 225). This may be accomplished by analyzing the signals 215 at one or more synchronized time periods at different base stations 225. The cross-correlation of the two or more versions of a signal 215 at different base stations 225 is done, which gives the time difference for the signal 215 arrival at those base stations 225. A particular value of the time difference estimate defines hyperbolas between the receivers on which the device may exist. As known in the art, there are a variety of different algorithms that may be employed in various TDOA systems, any of which may be used in this embodiment.

The communications network 110 routes the computed location data and identifier to the location processing server 115. The computed location of a device may then be associated with the appropriate reference location by matching identifiers. For example, by matching a timestamp for the reference location data and a timestamp for the triggering set of data, a reference location and computed location may be matched. Alternatively, a telephone number for a device 105 may be used to match a reference location and computed location, as may a range of other mechanisms known in the art.

Figure 3:
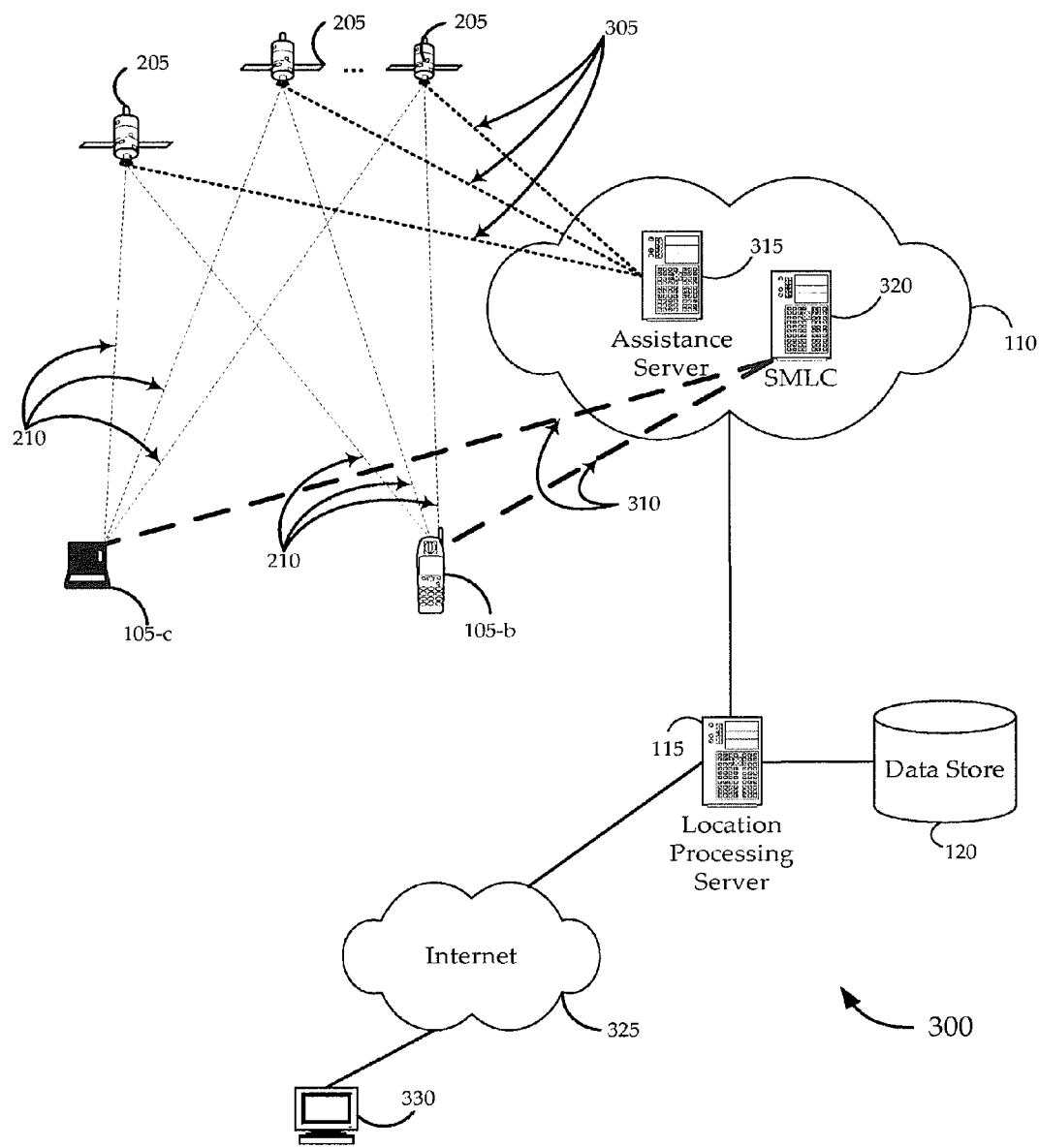
FIG. 3 is a block diagram illustrating a system for benchmarking an assisted GPS technique for locating a mobile communications device in a communications network, according to various embodiments of the present invention.

Turning to FIG. 3, an alternative exemplary telecommunications system 300 is illustrated. The system 300 comprises an exemplary embodiment of the system 100 described in relation to FIG. 1. The embodiment illustrated in FIG. 3 again includes a set of GPS satellites 205. Exemplary devices, including a cell phone 105-*b* and a laptop 105-*c*, receive GPS coordinate data 210 from the GPS satellites 205 (e.g., via a GPS receiver that is coupled with or otherwise integrated into the device). This GPS coordinate data 210 received comprises the reference location data. This GPS coordinate data 210 is transmitted in a communications signal through the network 110 to the location processing server 115. In other embodiments, the reference data may instead be transmitted over an alternative route (e.g., from a device over the Internet to the location processing server).

A device 105 in this embodiment transmits a payload in a data packet to the communications network 110, the payload configured to trigger the network 110 to identify the location of the device using an A-GPS analysis. The techniques for A-GPS are typically based on an assistance server 315 receiving GPS data 305 indirectly from GPS satellites 205 (e.g., via a Wide Area Reference Network, base stations, or other GPS receivers). The assistance server 315 processes received GPS data and performs calculations. For example, the assistance server may identify precise GPS satellite orbit and clock information, make initial position and time estimates, and identify satellite selection, range, and range-rate information. Upon request, the assistance server 315 provides the device 105 with "assistance" data including GPS almanac, Ephemeris, Satellite Clock corrections, Acquisition assistance, and Time Code Phase measurements.

Using this assistance data, the device 105 may make pseudorange measurements and forward this data 310 to a Serving Mobile Location Center (SMLC) 320. In one embodiment, the SMLC 320 proceeds to compute the location of the device 105. The SMLC 320 may compute position solutions, perhaps leaving the GPS receiver with the sole job of collecting pseudo-range measurements, and transmitting such measurements 310 to the SMLC 320. The SMLC 320 then calculates a computed position of a device, and generates a set of data (i.e., computed location data) identifying the location of a device 105. In an alternative embodiment, the assistance server 315 or the SMLC 320 may provide the device 105 with enough data to compute its location by itself. The assistance server 315 and the SMLC 320 may together comprise a single server, or may each comprise one or more different servers. As known in the art, there are a variety of different methods that may be employed in various A-GPS systems, any of which may be used in this embodiment.

The communications network 110 routes the computed location data to the location processing server 115. The computed location data for a device may then be associated with the appropriate reference location data and stored in the data store. In this embodiment, the location processing server is connected to the Internet 325, allowing queries and access to tables, reports, image data, etc. from a workstation 330 or other computing device at a remote location.

Figure 4:
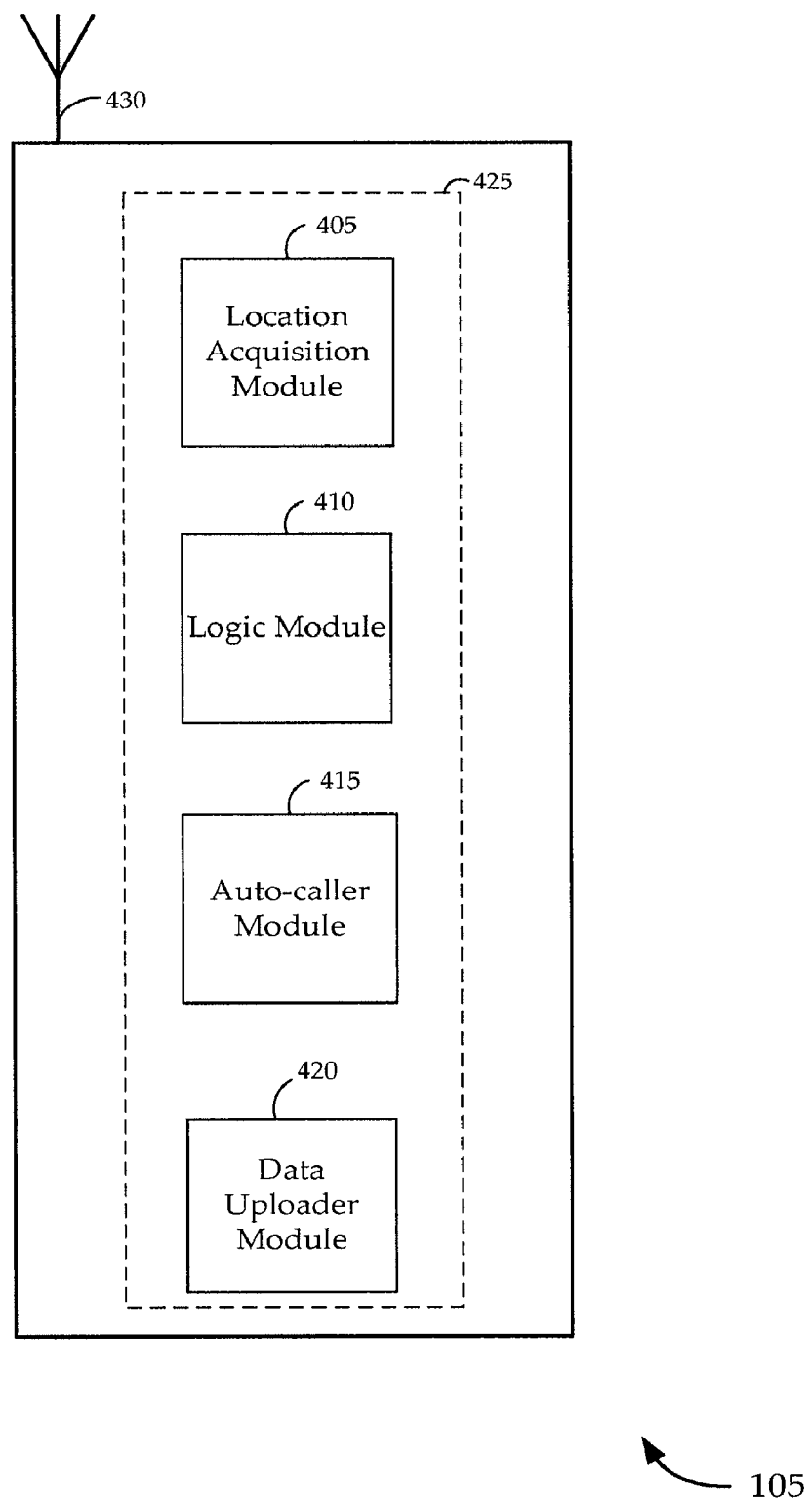
FIG. 4 is a block diagram illustrating a software module of a mobile communications device for a system of benchmarking location determination capabilities, according to various embodiments of the present invention.

FIG. 4 is a block diagram illustrating a set of exemplary software modules 425 providing certain functionality for a mobile communications device 105 configured according to various embodiments of the invention. In this embodiment, the modules 425 comprise one or more computer programs embodied on at least one computer readable medium, the one or more computer programs comprising instructions executable by the mobile communications device 105. The device also includes an antenna 430 configured to transmit and receive various communications signals.

The location acquisition module 405 in this embodiment acquires GPS data from a receiver in communication with the device over a Bluetooth interface. Data may be acquired at regular intervals (e.g., every second). Collected datasets may include latitude and longitude, timestamp, GDOP, quality of the position fix, and number of satellites used in location determination. The data is forwarded to the logic module where it is processed and test call initiation decision is made. In other embodiments, the location acquisition module 405 may be configured to receive or process other types of location based data, as well.

In this embodiment, the logic module 410 determines if the computed location data is to be collected (e.g., via a test call). "Readiness" inputs may include a determination that there is adequate signal strength at the device 105, sufficient accuracy of the position fix, and that no call is in progress. Thus, if these readiness metrics (which may be configurable or preset) don't indicate readiness, no test call will proceed.

If the device 105 is ready for location determination benchmarking, the device may transmit one or more communications signals to trigger a communications network to calculate location of the device (i.e., the computed location) at variable intervals. For example, the intervals may be preset time intervals (e.g., every 10 minutes, every hour). The time intervals may also be configurable, and different time intervals may be set for different times of the day or days of the week. The transmission may, alternatively, take place at the end of each call. The intervals may be related to distance movement metrics (e.g., transmit triggering data every 50 m, or 100 m of movement). The intervals may also be triggered by movement into certain regions (e.g., neighborhoods, cities, freeways, clusters, cells, or other regions). In one embodiment, there are intervals corresponding to the earlier of a time interval metric and a distance movement metric. Alternatively, the triggering signal may be transmitted from the device at other intervals, for example, at a given phone status (e.g., low battery), network status (e.g., at given signal strengths), with certain events (e.g., start-up, making a call, sending an email, use of certain applications, etc.), or certain altitudes. Thus, different rule sets may be combined (e.g., more frequent readings in certain regions; or reading every hour, unless distance metric triggers readings earlier). The reference data need not be transmitted with the network triggering data, and instead may be consolidated and transmitted at intervals to maximize power preservation on a device 105. The rules related to the intervals may be stored in the logic module.

At the applicable intervals for a "ready" device, the logic module 410 forwards a call initiation request to the auto-caller module 415 with the applicable GPS data. Subsequently received GPS data records may be cached by the logic module 410 for use in mid-call or updated positions. Upon traffic channel assignment, the auto-caller module 415 may be configured to request an updated GPS position from the logic module 410 for "updated" positions.

The auto-caller module 415 initiates test calls when instructed by the Logic module. Upon successful call setup, the auto-caller module 415 collects call specific data, such as Cell ID of the serving cell, control channel (BCCH) and traffic channel, and call setup success indicator. After each successful test call, the auto-caller module 415 compiles a record for the test call that includes the test call number, initial and updated GPS reference data, and call setup data. This data is then forwarded to the uploader module 420 that either caches the data record or uploads it after each call. In other embodiments, an auto-caller module may instead be configured to initiate the generation and transmission of a data packet with a payload configured to trigger the communications network to calculate the computed location data.

The data uploader module 420 is configured to obtain data records from the auto-caller module 415, and upload data sets to the centralized data store. In other embodiments, these data records may be transmitted to the data store with the triggering data. Generally, these programs 425 are stored in the storage medium of the device 105. Such software may be installed or updated via USB, Bluetooth, Infrared, Network download, or other means known in the art. Thus, in some embodiments, users may load the software without provisioning or interaction. Instead, the measurement and data generation may take place on a standard handset or other mobile device, and then may be sent over a data network. Various embodiments of the invention comprise a software application that can run on many wireless networks. In light of this capability, and as discussed below, the results may be compiled in a database and allow multi-carrier benchmarking. Different metrics for different carriers may be compared over a variety of times and geographic regions.

Although the modules 425 may be instructions embodied in a computer-readable medium, formatted to be executed by one or more general or application specific processors in the device, the functions may also be performed, in whole or in part, in hardware. Thus, the device 105 may comprise an Application Specific Integrated Circuit (ASIC) adapted to perform a subset of the applicable functions in hardware. Alternatively, the functions of the presentation instrument 100 may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art.

According to one set of embodiments of the invention, the data store 120 may be accessed remotely (e.g., as illustrated in FIG. 3, wherein a workstation 325 may access the location processing server 115 via the Internet 320 to query the data store 120), or via a direct connection to the data store 120. An interface may be used to access the data, and the data may be parsed in a variety of ways. A user interface may be used to break down reference and computed data according to any of the following: ranges of dates, ranges of time, subscribers, classes of subscriber, specific handset, device 105 models, carrier, service provider, geographic region, location determination metrics (e.g., accuracy, latency, or yield), or any combinations or subcombinations thereof. It is worth noting that data from different carriers and other service providers may be collected into one data store in real-time.

Exemplary date filter periods may include: past 24 hours, past 7 days, past month, past 3 months, past 6 months, or specific start and end dates. Exemplary time filter periods may include: past 15 minutes, past 30 minutes, past hour, past 3 hours, peak AM, peak PM, off peak AM, off peak PM, or specific start and end times. Exemplary geographic areas may be cities, states, or specific sub-regions created in a variety of ways known in the art. Information may be viewed along various service provider or network metrics. A user interface may also illustrate various metrics related to coverage over an area with a minimum accuracy level. The filters and other parameters illustrated in this paragraph are for purposes of example only, and a variety of additional metrics may be used as is evident to one skilled in the art.

Figure 5:
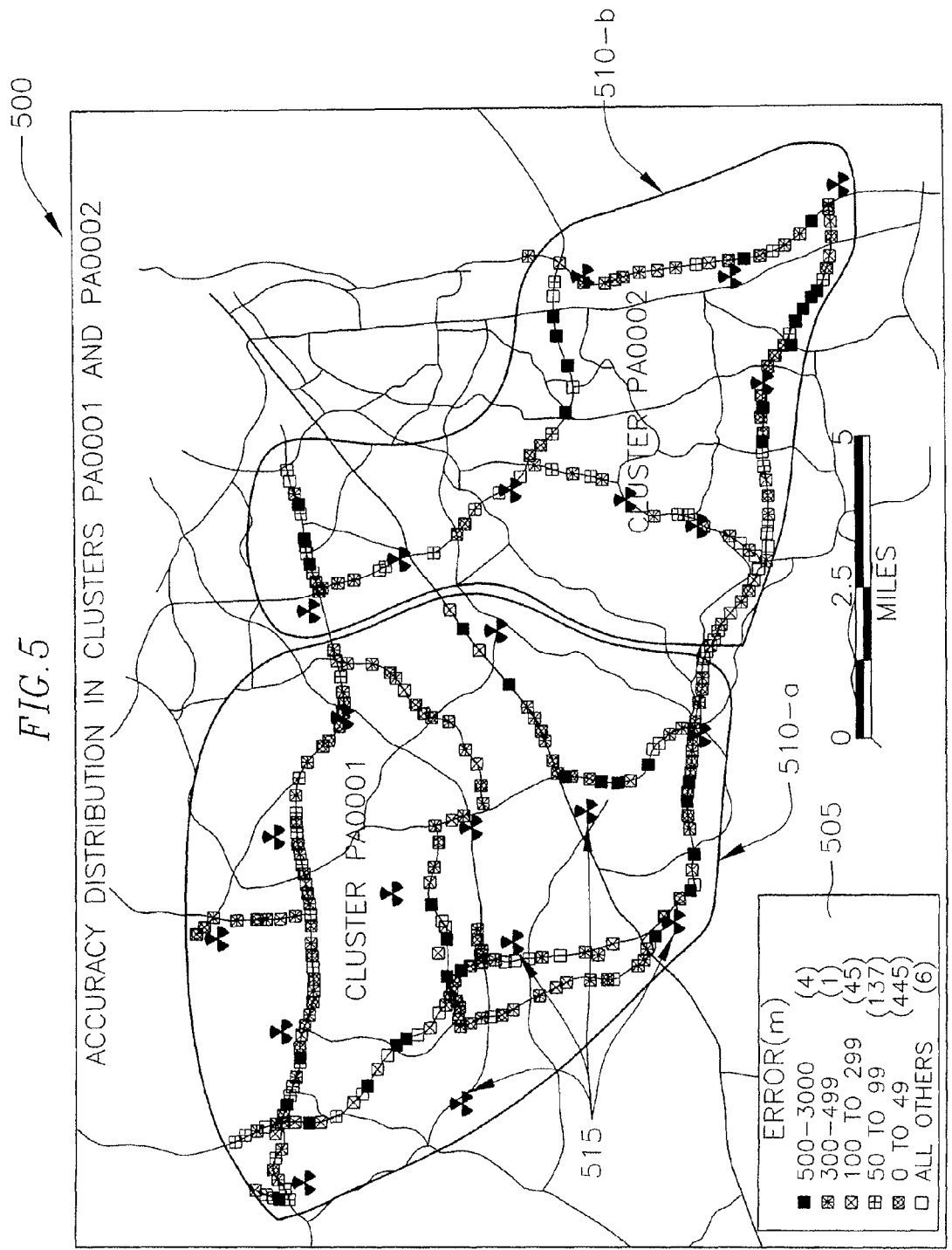
FIG. 5 represents an example of image data illustrating the accuracy of computed location data, according to various embodiments of the present invention.

According to some embodiments, the parsed data may be illustrated in a table, or in image data comprising a map of geographic areas of different sizes. The user interface may be configured to allow a user to create the table or map according to the criteria listed above. Different colors or shades of gray may illustrate different levels of location accuracy for measurements for certain geographic regions. In various embodiments, a map may illustrate major or minor roads, water, or other features. The user interface may control the parameters to which the map will be drawn. FIG. 5 illustrates an example of such a map 500 for a larger region. A legend 505 identifies different levels of accuracy associated with different shades, and the map 500 illustrates different individual measurements. In this example, the map 500 is divided into two clusters: PA0001 at 510-*a*, and PA0002 at 510-*b*. Base stations 515 are shown, as well.

Figure 7A:
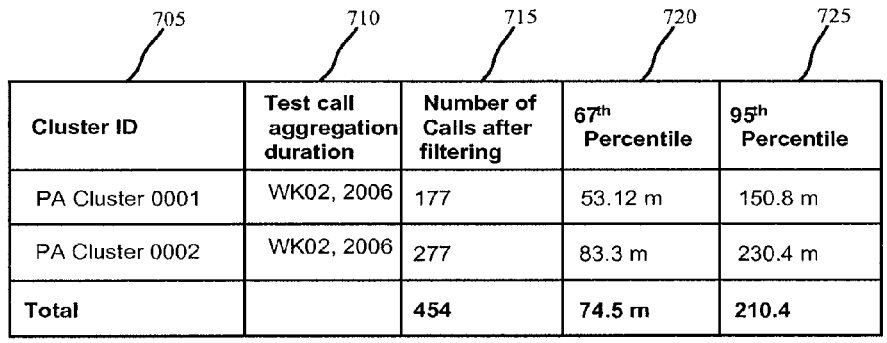
FIGS. 7A and 7B represent examples of interfaces each showing a table illustrating the accuracy of computed location data, according to various embodiments of the present invention.
Figure 7B:
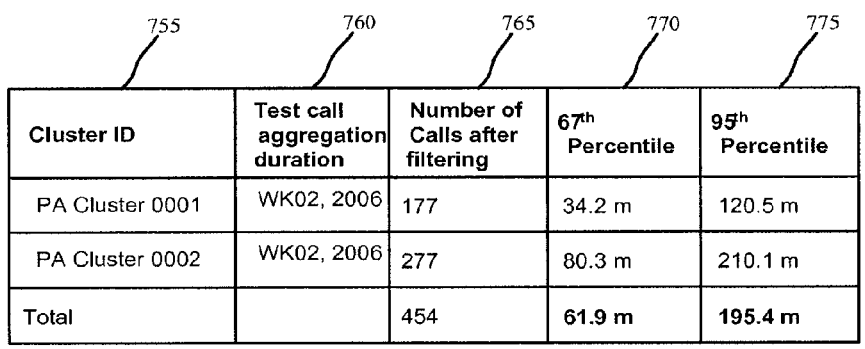

As set forth in FIG. 6, the parsed data may be illustrated in a table 600. This particular table 600 sets forth a set of accuracy measurements. In this example, data for each measurement in the table includes the called number 605, the UTC time 610, the number of satellites visible 615, the reference location data 620, the computed location data 625, and an error 630 (illustrating accuracy). Summary reports may be produced as well. FIG. 7A sets forth an example of such a report 700 for unweighted data. Information is collected relating to a given cluster 705. The test period duration 710, number of calls 715, and different percentiles 720, 725 are shown in the table as well. FIG. 7B sets forth an example of such a report 750 for weighted data. When data is weighted, certain geographic measurements at certain times may have more, or less, weight based on other collected data. As with the unweighted example, data may be collected relating to a given cluster 755. The test period duration 760, number of calls 765, and different percentiles 770, 775 are also shown in the table.

As noted above, image data and tables may be broken down to illustrate various reference and computed location metrics (e.g., accuracy, latency, and yield), different carriers and providers, and different subsets of subscribers, various geographic regions, and different time periods. Multi-carrier benchmarking is possible, comparing different providers over a variety of times, dates, and geographic regions, and according to various location determination metrics (e.g., accuracy, latency, and yield). To determine latency, a timestamp associated with one or more reference locations may be compared with a timestamp of the associated computed locations. Thus, using timestamps in this fashion, a time between the transmission of a test call (or other initiating event) and the computed location determination can be identified. To determine yield, the reference location data may be compared with the computed location data. Identifying the instances in which there is no computed location data to match reference location data can provide yield information. The reference and computed location data may be used for other purposes, as well.

Figure 8:
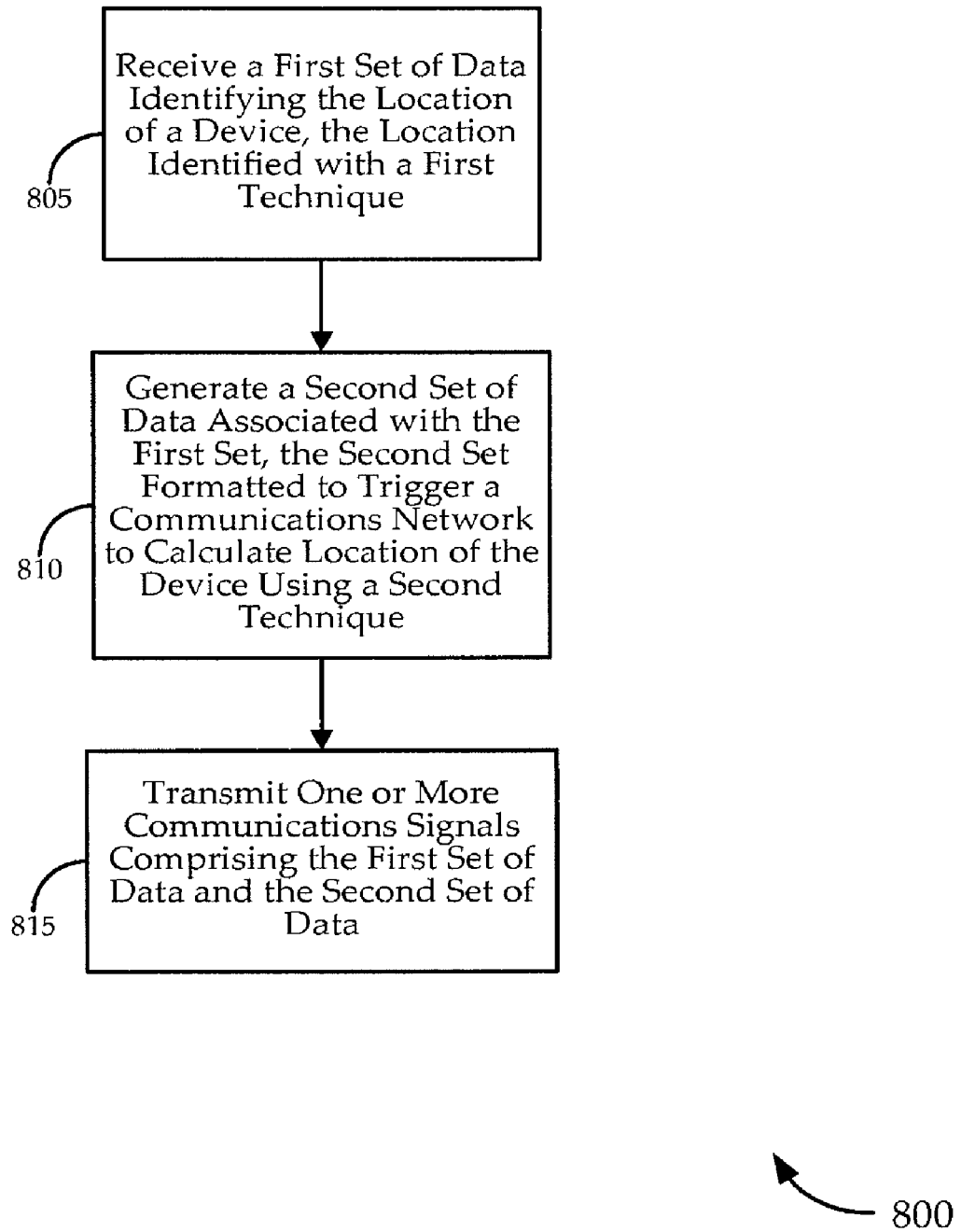
FIG. 8 illustrates a method of benchmarking location determination capabilities from a mobile communications device, according to various embodiments of the present invention.

FIG. 8 sets forth an exemplary embodiment of the invention, illustrating a method 800 of benchmarking location determination capabilities with a mobile communications device. At block 805, a first set of data identifying the location of a device is received, the location identified with a first technique. At block 810, a second set of data associated with the first set is generated, the second set formatted to trigger a communications network to calculate location of the device using a second technique. At block 815, one or more communications signals comprising the first set of data and the second set of data are transmitted.

Figure 9:
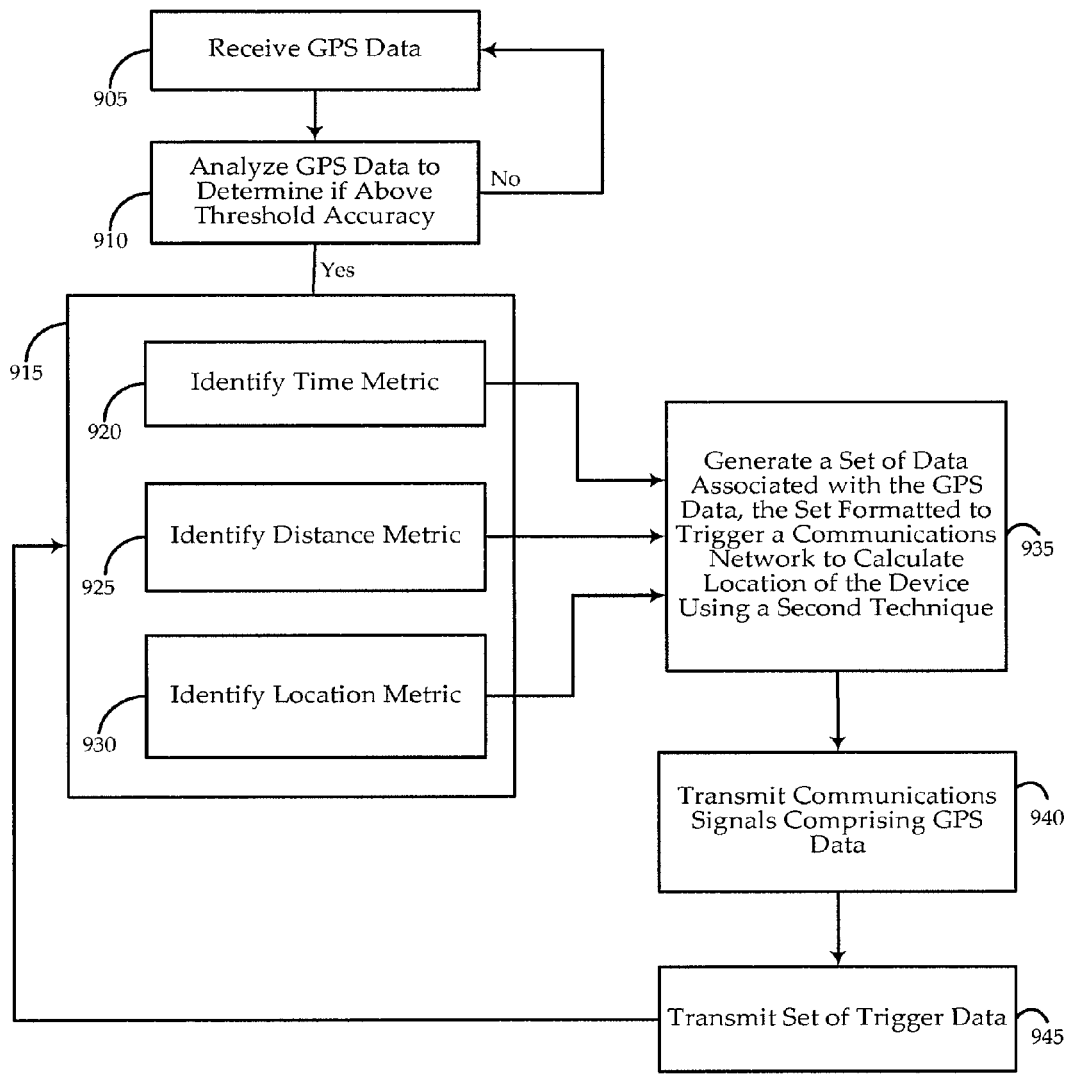
FIG. 9 illustrates an alternative method of benchmarking location determination capabilities from a mobile communications device, according to various embodiments of the present invention.

FIG. 9 sets forth an alternative embodiment, illustrating a second exemplary method 900 of benchmarking location determination capabilities from a mobile communications device. At block 905, GPS data is received and, at block 910, the data is analyzed to determine if it is above threshold accuracy level. If not, the process returns to block 905 for further GPS data reception at specified intervals. If the threshold is met, the method moves to a three-way monitoring process at block 915, wherein the earlier of 1) a time metric at block 920, 2) a distance metric at block 925, or 3) a location metric at block 930 is identified.

Based at least in part on the identification, a set of data associated with the GPS data is generated at block 935, the set formatted to trigger a communications network to calculate the location of the device using a second technique. At block 940, communications signals are transmitted comprising the received GPS data. At block 945, the set of data configured to trigger the network calculation is transmitted. Then, the process returns to block 915, where the three-way monitoring process continues.

Figure 10:
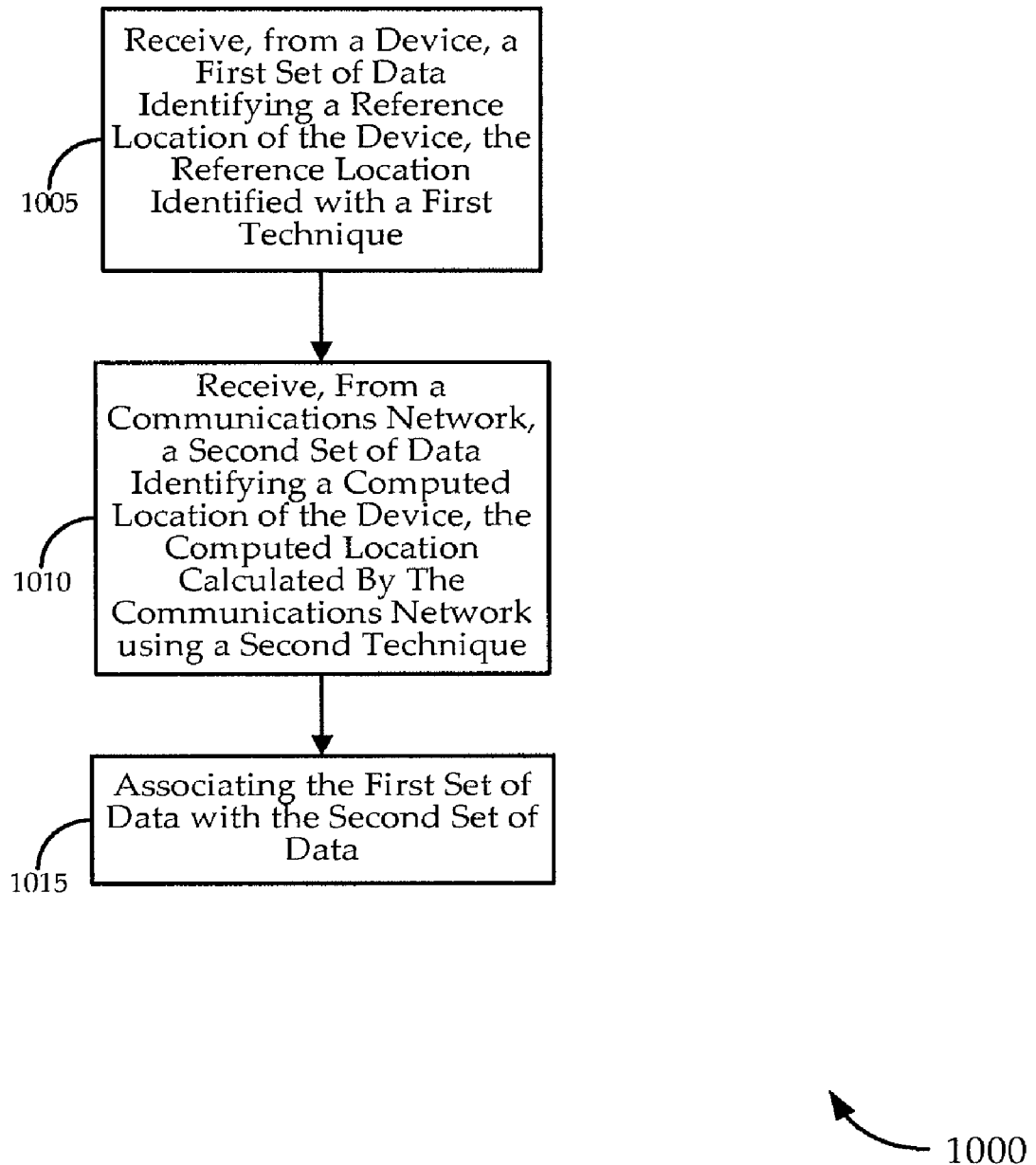
FIG. 10 illustrates a method of benchmarking location determination capabilities of a communications network, according to various embodiments of the present invention.

FIG. 10 sets forth an exemplary embodiment of the invention, illustrating a method 1000 of benchmarking location determination capabilities of a communications network. At block 1005, a first set of data is received from a device identifying a reference location of the device, the reference location identified with a first technique. At block 1010, a second set of data is received from a communications network, identifying a computed location of the device, the computed location calculated by the communications network using a second technique. At block 1015, the first set of data is associated with the second set of data.

Figure 11:
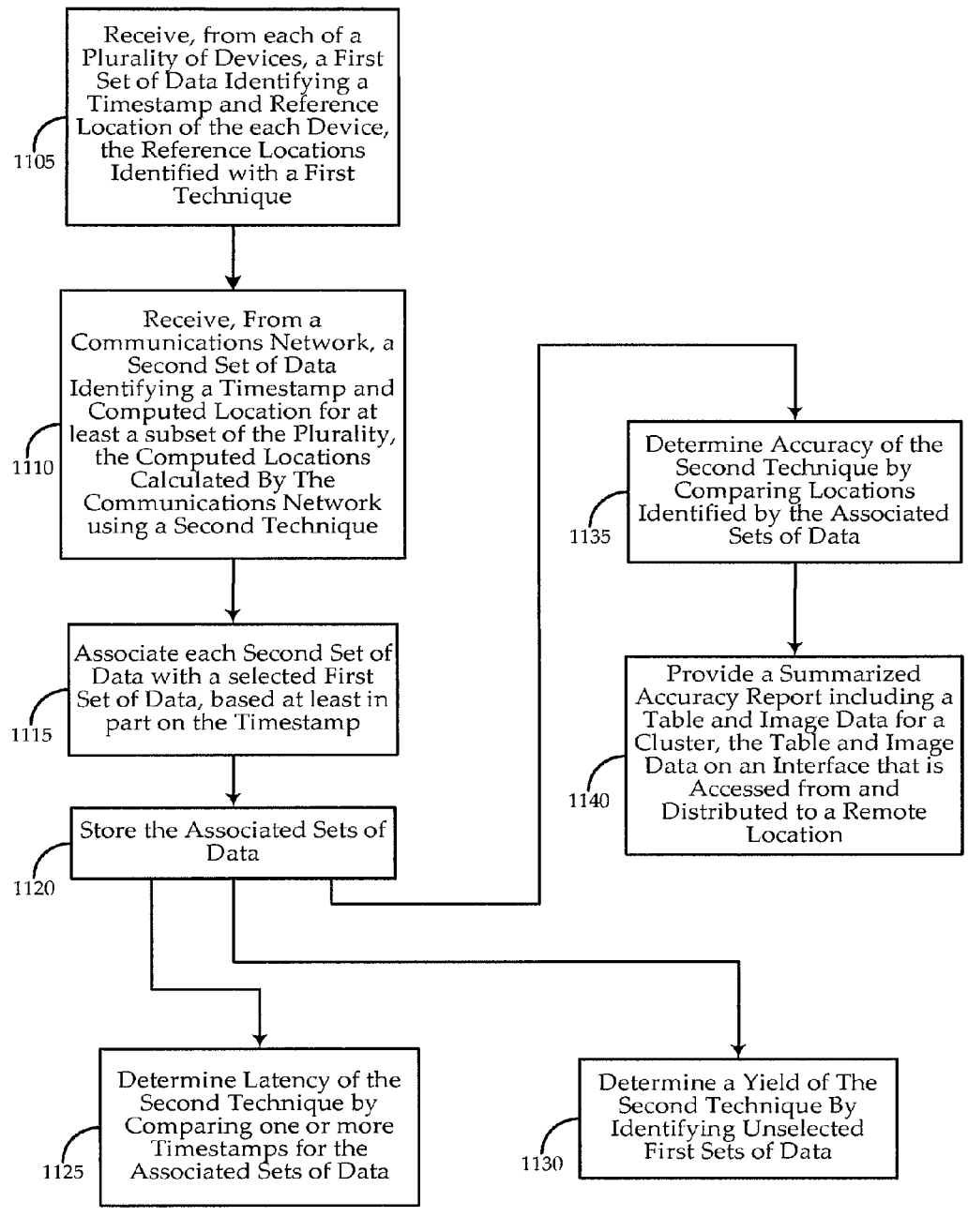
FIG. 11 illustrates an alternative method of benchmarking location determination capabilities of a communications network, according to various embodiments of the present invention.

FIG. 11 sets forth an alternative embodiment of the invention, illustrating a second exemplary method 1100 of benchmarking location determination capabilities of a communications network. At block 1105, a first set of data identifying a timestamp and reference location is received from each of a plurality of devices, the reference locations identified with a first technique. At block 1110, a second set of data identifying a timestamp and computed location for at least a subset of the plurality is received, the computed locations calculated by the communications network using a second technique.

At block 1115, each second set of data is associated with a selected first set of data, based at least in part on the timestamp, and at block 1120 the associated sets of data are stored. A number of determinations are then made. At block 1125, a latency of the second technique is determined by comparing one or more timestamps for the associated sets of data. At block 1130, a yield of the second technique is determined by identifying unselected first sets of data. At block 1135, accuracy of the second technique is determined by comparing locations identified by the associated sets of data. At block 1140, a summarized accuracy report is provided, including a table and image data for a cluster, the table and image data provided on an interface that is accessed from and distributed to a remote location.

Figure 12:
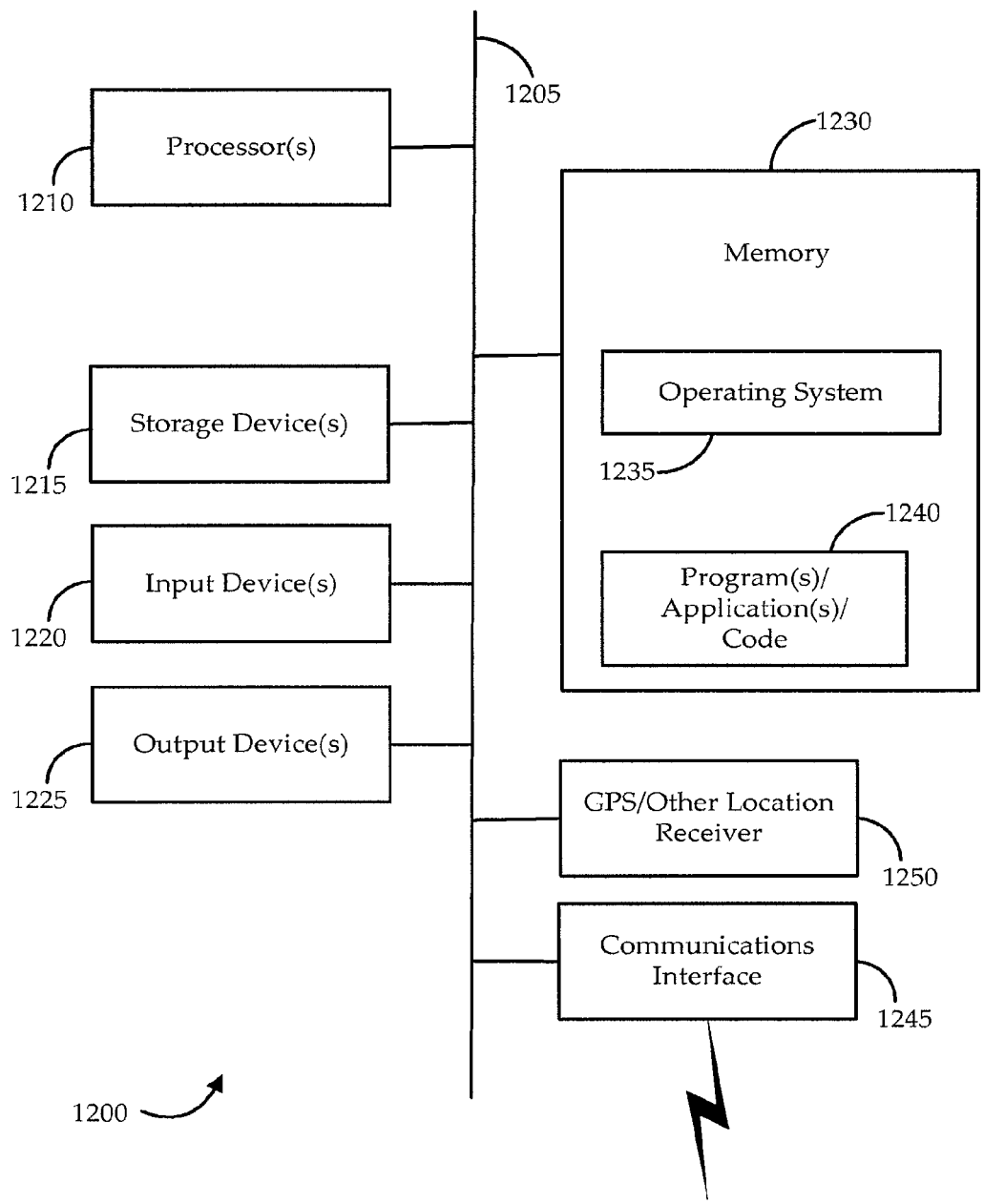
FIG. 12 is a schematic diagram that illustrates a representative device structure that may be used in various embodiments of the present invention.

Turning to FIG. 12, a device structure 1200 that may be used for a mobile communications device, location processing server, assistance server, network device, or other computing device described herein is illustrated with a schematic diagram. This drawing broadly illustrates how individual system elements of each of the aforementioned devices may be implemented, whether in a separated or more integrated manner. The exemplary structure is shown comprised of hardware elements that are electrically coupled via bus 1205, including processor(s) 1210 (which may further comprise a DSP or special-purpose processor), storage device(s) 1215, input device(s) 1220, and output device(s) 1225. The storage device(s) 1215 may comprise a computer-readable storage media reader connected to any computer-readable storage medium, the combination comprehensively representing remote, local, fixed, or removable storage devices or storage media for temporarily or more permanently containing computer-readable information. The GPS/Other Location Receiver 1050 may comprise any such receiver, whether separate or more integrated, that is configured to receive location based data as described herein. The communications interface 1245 may comprise a wired, wireless, or other type of interfacing connection that permits data to be exchanged with other devices. The communications interface 1245 may permit data to be exchanged with a network.

The structure 1200 may also comprise additional software elements, shown as being currently located within working memory 1230, including an operating system 1235 and other code 1240, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the systems, methods, and software discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow chart, a structure diagram, or a block diagram. Although they may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other computer readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method of associating location data in a communications network, the method comprising:

electronically receiving a first set of data related to a location determined with a first technique;

electronically calculating the same location using a second technique;

electronically generating a second set of data representative of the calculated location using the second technique; and electronically associating at least a subset of the first set of data with the second set of data to generate data for the communications network, wherein the electronically associating comprises electronically comparing the at least a subset of first set of data and the second set of data, and their associated timestamps to determine an accuracy, latency period, or yield attributable to the calculated location using the second technique.

2. The method of claim 1, wherein the location is a location of a mobile device, and wherein calculating the location using the second technique is performed by the mobile device.

3. The method of claim 1, wherein electronically calculating the location using the second technique is performed by the communications network.

4. The method of claim 1, wherein electronically calculating the location using the second technique is performed by a location server of a service provider coupled to the communications network.

5. The method of claim 1, wherein the first set of data identifying the location comprises GPS coordinate data.

6. The method of claim 1, wherein the first set of data identifying the location comprises location information specific to a current location of a mobile device.

7. The method of claim 6, wherein said location information specific to a current location of the mobile communications device is location data specific to a building.

8. The method of claim 1, further comprising executing an application on a mobile device to generate triggering data to trigger identification of the location of the mobile device.

9. The method of claim 1, wherein the second technique comprises one or more of the group consisting of assisted GPS, time difference of arrival, time of arrival, angle of arrival, RF Fingerprinting, and location pattern matching.

10. The method of claim 1, wherein the second technique comprises location identification based on network access points.

11. The method of claim 1, further comprising:
electronically receiving a third set of data identifying a second location of the device determined with said first technique;
electronically calculating the second location using said second technique;
electronically generating a fourth set of data representative of the calculated second location using said second technique;
electronically associating the at least a subset of the third set of data with the fourth set of data to generate data for a second communications network.

12. The method of claim 1, further comprising:
electronically receiving a third set of data identifying a second location determined with said first technique;
electronically calculating the second location using said second technique;
electronically generating a fourth set of data representative of the calculated second location using said second technique;
electronically associating the at least a subset of the third set of data with the fourth set of data to generate data for a second communications network.

* * * * *

UNITED STATES PATENT AND TRADEMARK OFFICE
CERTIFICATE OF CORRECTION

| | | |
|---|---|---|
| PATENT NO. | : 8,391,176 B2 | |
| APPLICATION NO. | : 12/902421 | |
| DATED | : March 5, 2013 | |
| INVENTOR(S) | : Sekhar Kota et al. | |

It is certified that error appears in the above-identified patent and that said Letters Patent is hereby corrected as shown below:

On the Title Page,
item (73) Assignee          Delete "TechnoCam",
                            Insert --TechnoCom--

Signed and Sealed this
Twenty-sixth Day of November, 2013

Margaret A. Focarino
*Commissioner for Patents of the United States Patent and Trademark Office*